April 9, 1940.  W. F. BERCK  2,196,805
CONTROL APPARATUS FOR LIQUID METERS
Filed Oct. 16, 1937   6 Sheets-Sheet 1
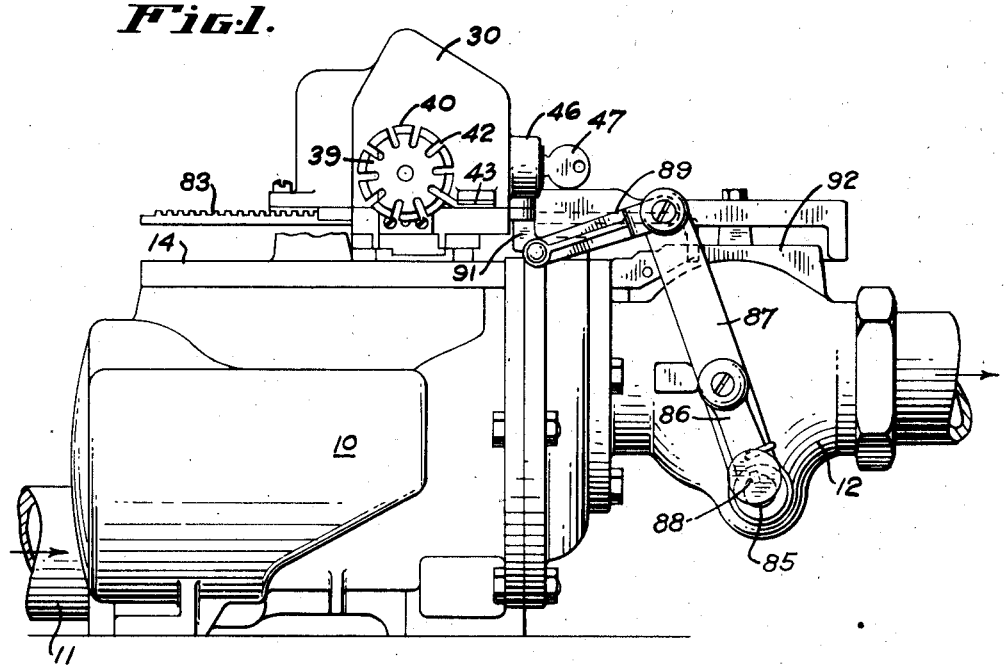
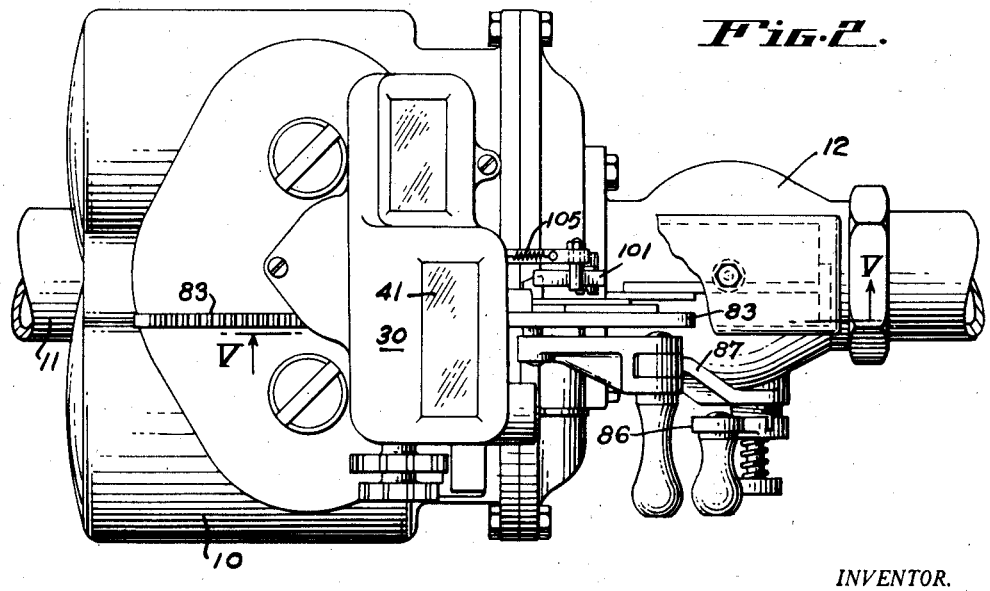
INVENTOR.
WILLIAM F. BERCK
BY Oscar A. Mellin
ATTORNEY.

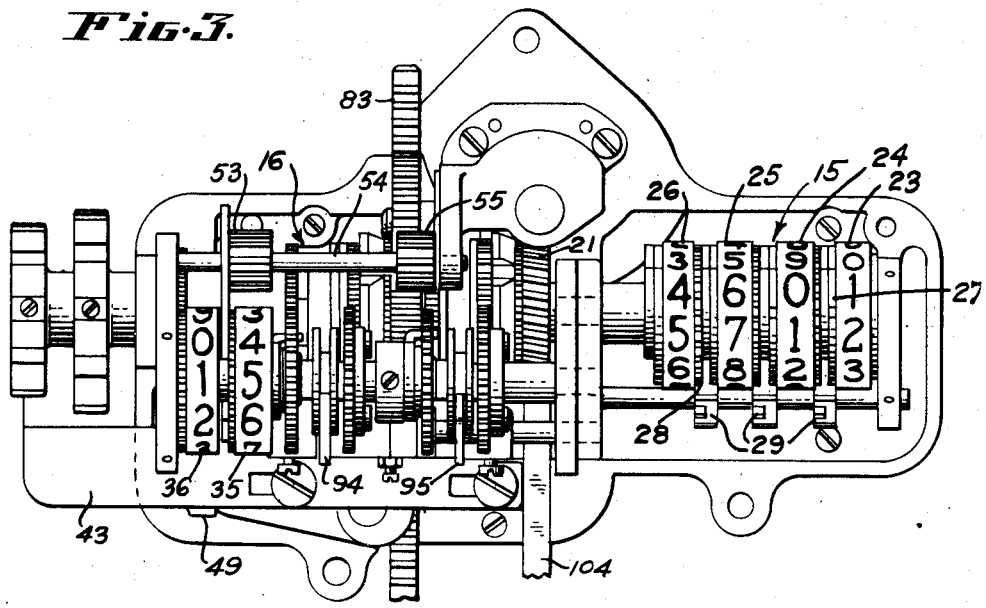
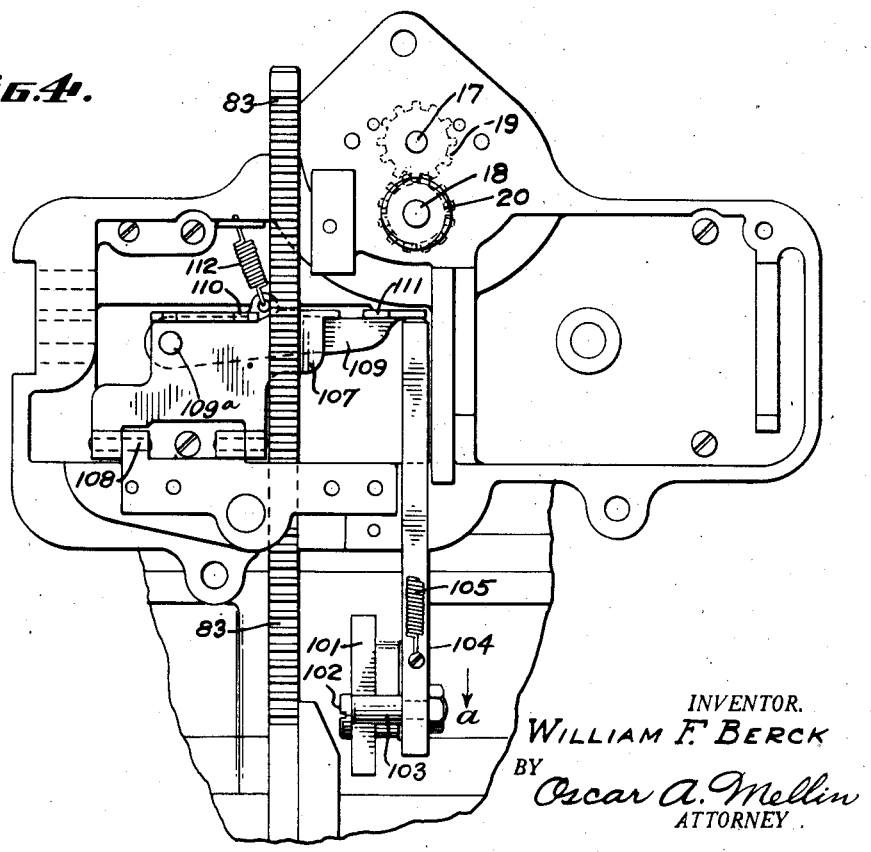

April 9, 1940.  W. F. BERCK  2,196,805

CONTROL APPARATUS FOR LIQUID METERS

Filed Oct. 16, 1937  6 Sheets-Sheet 3

INVENTOR.
WILLIAM F. BERCK
BY
Oscar A. Mellin
ATTORNEY.

April 9, 1940.   W. F. BERCK   2,196,805
CONTROL APPARATUS FOR LIQUID METERS
Filed Oct. 16, 1937   6 Sheets-Sheet 4

INVENTOR.
WILLIAM F. BERCK
BY Oscar A. Mellin
ATTORNEY.

April 9, 1940.  W. F. BERCK  2,196,805
CONTROL APPARATUS FOR LIQUID METERS
Filed Oct. 16, 1937  6 Sheets-Sheet 5
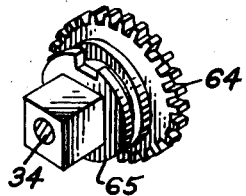
Fig.15.
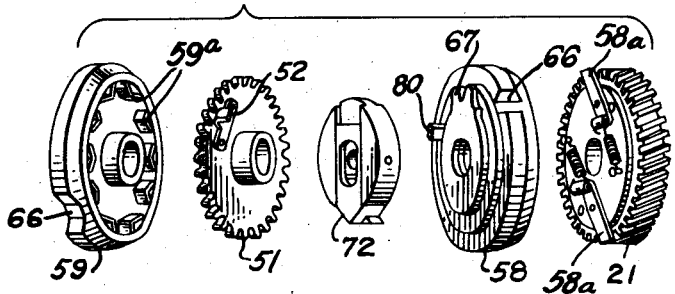
Fig.10.
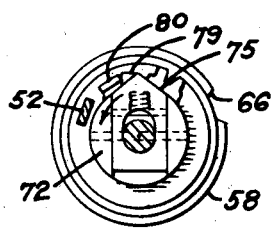
Fig.11.
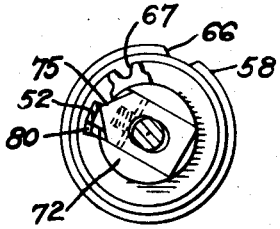
Fig.12.
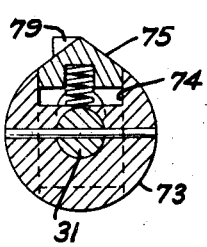
Fig.13.
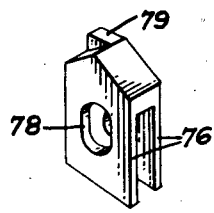
Fig.14.
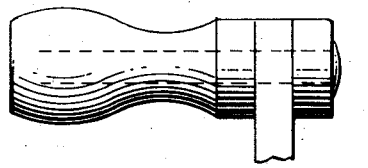
Fig.16.
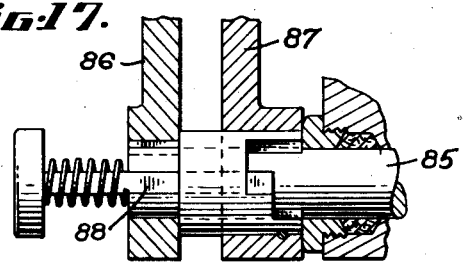
Fig.17.
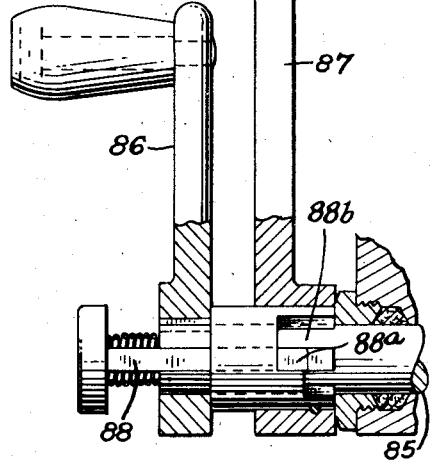
INVENTOR.
WILLIAM F. BERCK
BY Oscar A. Mellin
ATTORNEY.

Patented Apr. 9, 1940

2,196,805

UNITED STATES PATENT OFFICE 2,196,805

CONTROL APPARATUS FOR LIQUID METERS

William F. Berck, Oakland, Calif., assignor to Ralph N. Brodie Company, Oakland, Calif., a corporation of California Application October 16, 1937, Serial No. 169,494

17 Claims. (Cl. 235—132)

This invention relates to liquid meters and similar measuring apparatus which is provided with mechanism enabling predetermining of the quantity of liquid that shall be delivered from the meter and automatically stopping the flow of such fluid upon the delivery of such predetermined quantity.

It is the principal object of the present invention to provide an improved and efficient mechanism for liquid meters to accurately predetermine the quantity of fluid to be delivered therefrom during one operation, which mechanism enables selective predetermining of the amount to be delivered upon each operation, and further enables repeating the delivery of such selected quantity to any extent without further manipulation of the mechanism other than a single manual operation resulting in the opening of the meter shut off valve and operation of the meter.

In practicing my invention, I provide an automatic mechanism which is operatively associated with the meter and the meter shut off valve. By manually setting this mechanism, the quantity delivered from the meter during any one operation thereof may be selectively predetermined. The association between the mechanism and the shut off valve is such that after the mechanism is manually adjusted to indicate the selected quantity desired, the single operation resulting in opening of the shut off valve conditions the mechanism so that the valve will be automatically closed immediately upon the delivery of the selected quantity. This quantity may be repeatedly delivered by the single operation referred to and without manually resetting the mechanism. Consequently, the selected amount may be changed by the operator after any operation of the meter.

One form which the invention may assume is exemplified in the following description and illustrated by way of example in the accompanying drawings, in which:

Fig. 1 is a view in side elevation of a meter and shut off valve equipped with my improved mechanism.

Fig. 2 is a plan view of the same.

Fig. 3 is a plan view of the totalizer counter and my improved automatic quantity selecting mechanism and shut off valve trip with the cover removed.

Fig. 4 is a fragmentary view in plan showing the trigger mechanism for tripping the shut off valve after a predetermined quantity of liquid has been delivered from the meter.

Fig. 10 is a schematic view showing the various elements assembled on the trip wheel shaft separately and in perspective.

Figs. 11 and 12 are views in transverse section through the trip wheel shaft showing the relationship of the pawl, trip and set wheels in two different positions.

Fig. 13 is an enlarged view in transverse section through one of the pawl wheels.

Fig. 14 is an enlarged view in perspective of the pawl of such wheel.

Fig. 15 is a view in perspective of one of the stop wheels and its stop clutch.

Figs. 16 and 17 are enlarged fragmentary views showing the connection between the valve shaft and valve operating levers.

Figure 5:
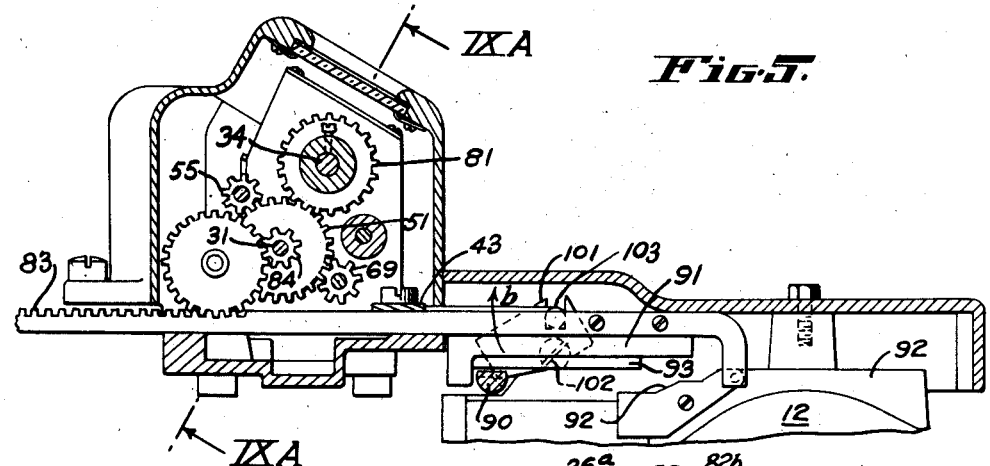
Fig. 5 is a view in transverse section taken on line V—V of Fig. 2.

Referring more particularly to the accompanying drawings, I have there illustrated a meter 10 of the displacement type having an inlet connection 11 associated with a supply of fluid under pressure. The meter is of a standard type and therefore need not be illustrated in detail. The outlet of the meter is connected with a shut off valve 12 of the conventional type in which the valve member is normally held in closed position by spring means and may be opened against the flow manually. As the valve 12 is of conventional design, the internal construction thereof is not illustrated. When the valve 12 is closed, the meter 10 is not in operation, but the moment that the valve 12 is opened, the fluid commences flowing through the meter and the latter measures the same.

Mounted on the meter casing 10 and fixed thereto in any suitable manner is a counter base plate 14 supporting a totalizing counter assembly 15 and an automatic packaging and shut off valve trip assembly 16. For driving both of these devices, the meter 10 is fitted with a meter driven vertical shaft 17 which drives a counter drive shaft 18 through the medium of a pair of spur gears 19.

Figure 7:
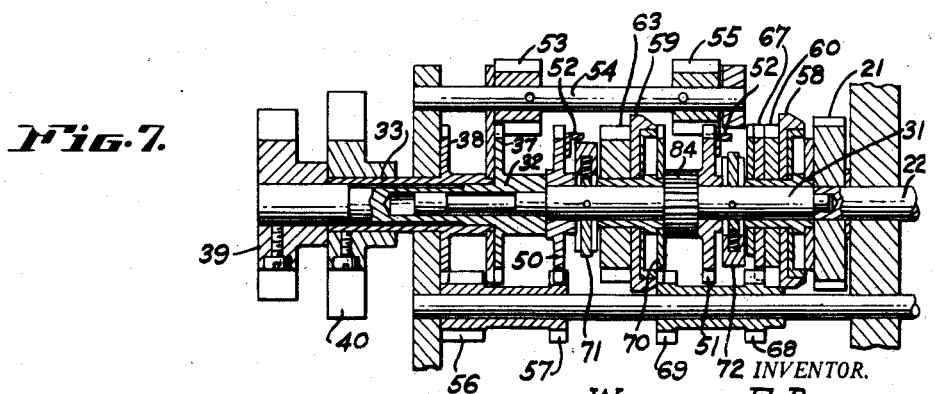
Fig. 7 is a fragmentary view in longitudinal section taken along the center of the indicator and trip wheel shafts.

It will be seen from Figs. 3, 4 and 7 that the counter drive shaft 18 is fitted with a worm 20 which is in mesh with a worm wheel 21 secured on the totalizer counter drive shaft 22. Secured on this totalizer drive shaft 22 is a units wheel 23 and mounted in juxtaposition thereto and freely rotatable on said shaft are tens wheel 24, hundreds wheel 25 and thousands wheel 26. A conventional transfer connection is provided between said wheels and which includes a mutilated gear 27 secured to each of the wheels 23 to 26, inclusive, a spur gear 28 secured to the wheels 24 to 26, inclusive, and transfer pinions 29 which mesh with the mutilated gear 27 of one wheel and the spur gear 28 of the next adjacent wheel. The construction just described is a conventional one and it is believed that the foregoing description is ample for the purposes of this application.

It is obvious that when the meter commences operating, the pistons thereof will drive the meter driven shaft 17 which will drive the counter drive shaft 18 through the spur gears 19, and will drive the counter drive shaft 22 through the worm 20 and worm wheel 21. Operation of this shaft will operate the units wheel 23 and through it, the tens, hundreds and thousands wheels in their proper relationship.

The worm wheel 21 also operates the packaging and shut off valve trip mechanism 16 as will be described. The purpose of this mechanism is to enable the operator to pre-select a predetermined quantity of fluid to be discharged through the meter at one time by simply setting the indicator wheels thereof to indicate the selected quantity and then open the shut off valve 12. As the meter commences discharging fluid, the mechanism will be operated by the meter, and when the amount discharged equals the selected amount, the shut off valve 12 will be automatically tripped to stop the meter and flow of fluid. By merely reopening the valve, the same is reset to the same predetermined setting for a subsequent and successive operation. This may be carried on until the operator is desirous of changing the quantity to be delivered.

The automatic packaging control mechanism and valve trip mechanism is mounted on a frame formed as an integral part of the base plate 14 and is preferably enclosed in a separate casing 30 which may be secured to the base plate 14 by cap screws or other suitable means. The mechanism includes a trip wheel shaft 31 mounted in axial alignment with the counter drive shaft 22 and bearing at its opposite end within a tubular units wheel setting shaft 32, the latter being telescoped into a tubular tens wheel setting shaft 33. It is apparent that the trip wheel shaft 31, the units wheel setting shaft 32 and the tens wheel setting shaft 33 are all in axial alignment and independently revoluble with respect to each other.

Mounted in parallelism with the shafts 31 to 33, inclusive, at a spaced distance therefrom and journaled at its ends in the frame is a jack shaft 34. Rotatably mounted on this shaft is a units indicator wheel 35 and a tens indicator wheel 36, both rotatably mounted on the shaft 34. The units indicator wheel 35 and the tens indicator wheel 36 are each fitted with a fixed gear 35a and 36a. The gear 35a of the units indicator wheel 35 is in mesh with a spur gear 37 fixed on the units indicator wheel setting shaft 32, while the gear 36a of the tens indicator wheel 36 is in mesh with a spur gear 38 fixed on the tens indicator wheel setting shaft 33.

Consequently it will be seen that by revolving the units wheel setting shaft 32 by means of a hand wheel 39, which is fixed thereto, that a drive will be imparted to the gear 37 and thence to the gear 35a to the indicator wheel 35, which wheel may be set in any one of its ten stations, it being numbered zero to nine on its periphery. Likewise, it is obvious that by revolving the tens wheel setting shaft 33 through the medium of the hand wheel 40 secured thereto that a drive will be imparted from the gear 38 to the gear 36a, which will set the indicator wheel 36 to any one of its ten stations as desired, this wheel likewise being numbered on its exterior from zero to nine.

At this point it is desired to point out that the hand wheels 39 and 40 are provided with a plurality of equally spaced longitudinal notches 42 in their peripheries which are spaced to correspond with the stations of the indicator wheels 35 and 36, so that by aligning one of these notches in each wheel 39 and 40, the numbers on the indicator wheels 35 and 36 will not only be in proper alignment in view of the window 41 in the casing 30, but they will be correctly positioned in their selected stations.

It is desirable not only for this purpose to engage and latch the hand wheels 40 against turning but likewise for the purpose of latching the counter wheels 35 and 36 against rotation after once being set to a predetermined reading. To cooperate with the slots 42, I have provided a latching plate 43 which is mounted on the base plate 14 as shown in Fig. 3 for a limited amount of reciprocation in a direction parallel to the axes of the hand wheels 39 and 40. The latching plate 43 is provided with two upturned tangs 44 and 45 capable of being shifted into and out of engagement with the slots 42 of the hand wheels 39 and 40 so as to effect latching or unlatching of these wheels.

The latching plate 43 is normally held in latching position by means of a key controlled lock 46 which is controlled by a key such as illustrated at 47. The tumbler of the lock 46 is fitted with a cylindrical keeper 48, shown in Fig. 6, which engages a lug 49 formed as a part of the latching plate 43. By turning of the key 47, the tumbler is turned and revolves the keeper 48 and in this manner shifts the latching plate 43 endwise so as to shift the tangs 44 and 45 either into or out of engagement with the slots 42 in the hand wheels 39 and 40.

Rotatably mounted on the trip wheel shaft 31 are two similar set wheels 50 and 51, most clearly illustrated in Figs. 7 and 10, where it will be shown that these wheels are provided with spur gear teeth and provided with an axially projecting trip lug 52 fixed to one face thereof at an eccentric point thereon. It should be said that the positioning of the trip lugs 52 of the set wheels 50 and 51 predetermines the amount of liquid which may flow through the meter prior to the closure of the shut off valve. The units set wheel 51 is set simultaneously with the setting of the units indicator wheel 35 and the tens set wheel 50 is set or positioned simultaneously with the setting of the tens indicator wheel 36. It should be said that the set wheels 50 and 51 likewise have ten stations of setting which correspond exactly with the ten stations of setting of the indicator wheels 35 and 36.

To set the set wheel 51, the gear 37 of the units wheel setting shaft 32 meshes with a pinion 53 pinned on a shaft 54 also having a similar pinion 55 pinned thereon which is in mesh with the spur gear teeth of the set wheel 51. The gear 38 on the tens wheel setting shaft 33 meshes with a pinion 56 relatively fixed to a pinion 57 which meshes with the spur gear teeth on the set wheel 50, so that the set wheels 50 and 51 are positioned at their proper station simultaneously with the setting of the indicator wheels 35 and 36 and are stationarily held in these positions by means of the latching plate 43 engaging the wheels 39 and 40, as previously described.

Figure 6:
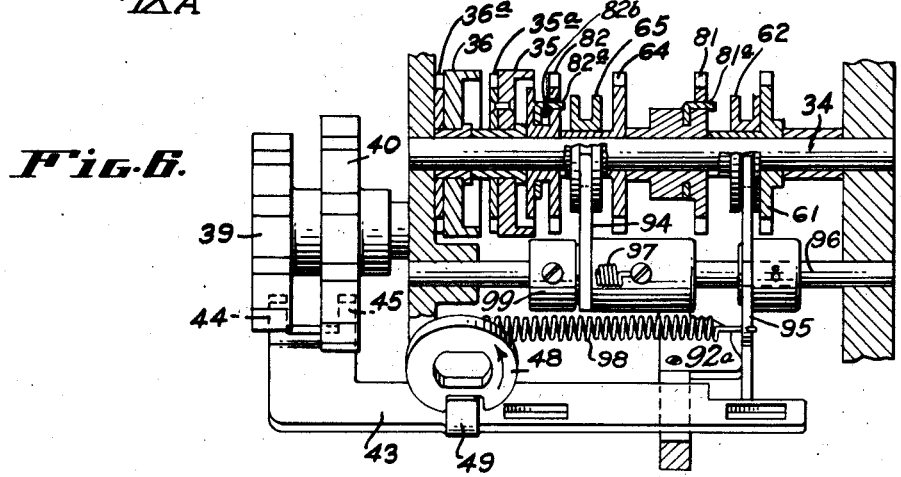
Fig. 6 is a fragmentary view in longitudinal section through the automatic packaging and shut off valve trip assembly, and showing the operative association between the stop clutches and also showing the latching mechanism for latching the indicator wheels and its associate mechanism in a set position.

Rotatably mounted on the trip wheel shaft 31 are two trip wheels 58 and 59, the units trip wheel 58 having fixed thereto a spur gear 60 in mesh with a toothed stop wheel 61 on the jack shaft 34. This stop wheel 61 has a hub having a squared exterior periphery on which is slidably but non-rotatably mounted a stop clutch 62. The tens trip wheel 59 has a gear 63 similar to the gear 60 and similarly in mesh with a toothed stop wheel 64 of a construction the same as that of the wheel 61, and which is likewise rotatable on the shaft 34 and provided with a hub having a squared external perimeter on which a stop clutch 65 is slidably but non-rotatably mounted. The construction of the stop wheels 61 and 64 with their stop clutches 62 and 65 is illustrated in Figs. 6 and 15.

Figure 9:
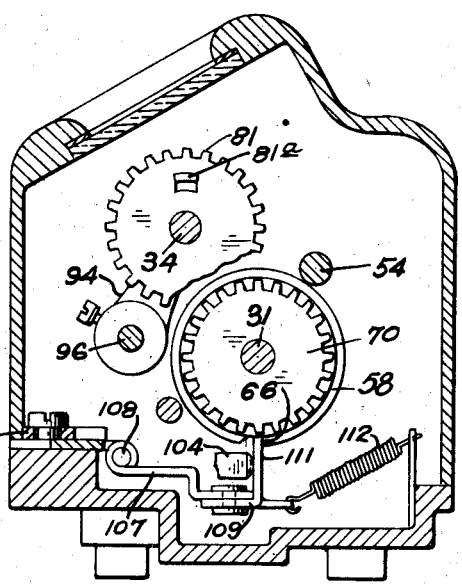
Fig. 9 is a transverse sectional view through the same mechanism taken on line IX—IX of Fig. 3.
Figure 9A:
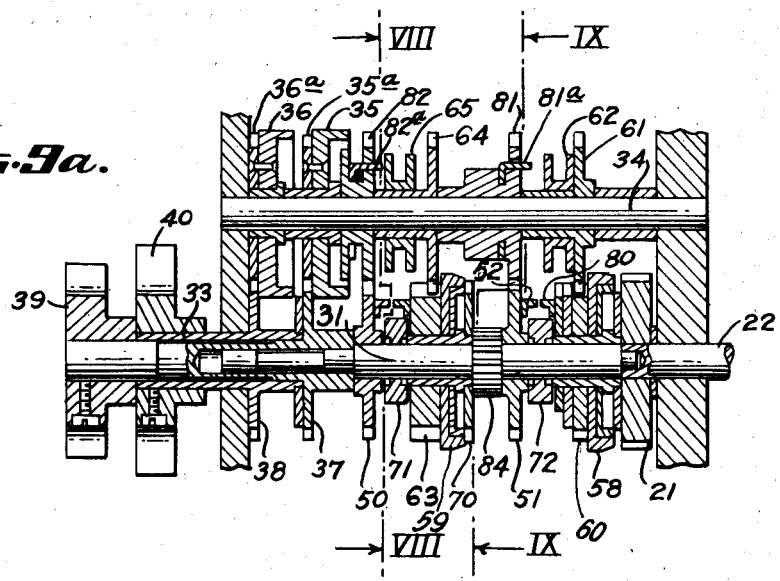
Fig. 9a is a longitudinal sectional view taken on line IXA—IXA of Fig. 5.

In the periphery of each of the trip wheels 58 and 59 is a coaxially extending trip groove 66, as illustrated in Figs. 9 and 10, and it should be stated that these trip wheels likewise will have ten stations defined by internal ratchet teeth 59a conforming to the ten stations of the indicator wheels and the set wheels, and which stations are zero to nine, and when the trip wheels are in zero station, the trip grooves will be aligned at the underside of and in vertical alignment with the center of rotation of the wheels as illustrated in Fig. 9. The valve 12 is closed when the trip wheels are in their zero stations.

It should be pointed out here that there is a transfer mechanism between the units trip wheel 58 and the tens trip wheel 59 so that (as will be described) any movement of the units wheels out of its zero station will effect a one-tenth revolution of the tens trip wheel. This transfer mechanism includes a multilated gear 67 fixed on the units trip wheel 58 and meshing with a multilated pinion 68 relatively fixed to a pinion 69 which meshes with a gear 70 connected to the tens trip wheel through a one-way ratchet mechanism involving the ratchet teeth 59a and a companion pair of ratchet pawls 58a, as shown in Fig. 7 and 10, so that it will transmit a drive to said tens trip wheel 59 in one direction and likewise enable the tens trip wheel to be rotated independently of the gear 70 in the same direction. This same type of ratchet mechanism forms the driving connection between the worm wheel 21 and the units trip wheel 58 as shown in Fig. 10.

It should be pointed out that to set the trip wheels 58 and 59 in their respective selected stations corresponding with the selected stations of the indicator wheels 35 and 36, I have provided two pawl wheels 71 and 72, most clearly illustrated in Figs. 13 and 14, where it will be seen that the pawl wheels comprise a cylindrical wheel 73 pinned or otherwise suitably secured to the shaft 31 and formed with a comparatively wide radial slot 74 in its periphery extending between its side faces. Slidably fitting said slot 74 for movement in a radial direction is a pawl 75 which is spring urged radially outward. This pawl has two side plates 76 fitting transverse grooves in opposite sides of the wheel 73 in alignment with the radial slot 74 so that the pawl will be free to move radially but will be held against axial movement with respect to the wheel. The radial movement of the pawl is limited to the dimensions of the slotted openings 78 in the side plates 76 which embraces the shaft 31.

The pawl wheels 71 and 72 are fixed on the shaft 31 with the high point of the pawls spaced at 180 degrees part. Both faces of the pawl are cam like with the same inclined rise with the exception that half of one face is provided with a cam lug 79, the purpose of which will be readily seen.

Projecting half way over the face of the pawl wheel 72 is a set lug 80 rigidly fastened at an eccentric position to the trip wheel 58 at a radial distance from the center of that wheel just slightly greater than the radius of the wheel 73 of the pawl wheel, so that it will be engaged by the cam faces of the pawl 75 and particularly by the lug 79. This is most clearly illustrated in Figs. 11 and 12, where it is seen that if the pawl were turned in an anti-clockwise direction, that the cam lug 79 would engage the set lug 80 and thereupon revolve the units trip wheel 58 as long as the engagement of the cam lug 79 and the set lug 80 were permitted.

However, as previously described, the set wheel 51 has a lug 52 projecting therefrom half way over the surface of the pawl wheel 72 but not far enough to be engaged by the cam lug 79. The radial position of the lug 52 is such, as illustrated in Figs. 11 and 12, that it will ride up on the inclined surface of the pawl 75 and move the pawl radially inward with respect to the axis of the pawl wheel and disengage the cam lug 79 from the set lug 80 of the units trip wheel 58, thereupon leaving the same at the station predetermined by the setting of the indicator wheels 35 and 36.

The construction and operation and the relative association of the pawl wheel 71 with the tens trip wheel 59 and the set wheel 50 is the same as that just described except that the pawl of the pawl wheel 71 is set at 180 degrees form that of the pawl wheel 72 and that the position of the set wheel 50 is determined by the position of the indicator wheel 36, while the position of the set wheel 51 is determined by the position of the units indicator wheel 35.

Therefore, when the shaft 31 is rotated in an anti-clockwise direction with respect to Fig. 11, the pawls of the pawl wheels 71 and 72 will engage the respective set lugs 80 of the respective trip wheels 58 and 59 and revolve these wheels to a set position predetermined by the setting of the indicator wheels 35 and 36, at which point they will disengage from said wheels due to the previous setting of the lugs 52 of the set wheels 50 and 51.

For the purpose of preventing overrunning of the trip wheels 58 and 59 during resetting when the rotative speeds may be rapid, I have provided on the jack shaft 34 two keeper wheels 81 and 82, both of which are freely rotatable on the shaft 34. However, the keeper wheel 81 is formed with spur gear teeth and is in mesh with the set wheel 51, and the keeper wheel 82 is formed with spur gear teeth and is in mesh with the set wheel 50 so that when the set wheels are latched, as previously described, the keeper wheels 81 and 82 will likewise be secured in position.

Figure 8:
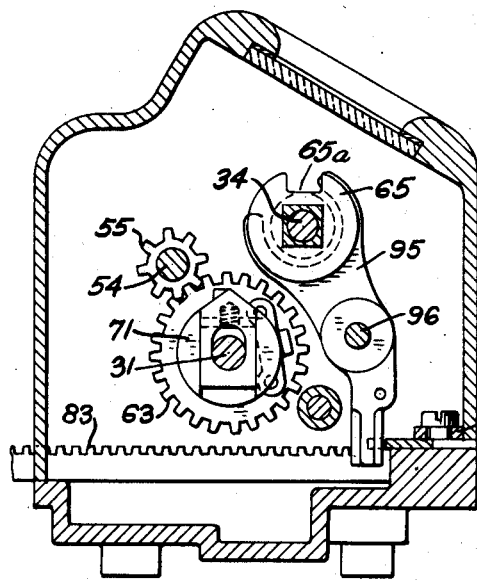
Fig. 8 is a transverse sectional view through the automatic packaging and shut off valve trip assembly taken on line VIII—VIII of Fig. 3.

The keeper wheel 81 is provided with a fixed keeper lug 81a which has a definite angular position with respect to the lug 52 on the set wheel 51 so that when the set wheel assumes a position at its proper station, the keeper lug 81a will likewise assume a definite relative position with respect thereto so that when the units trip wheel 58 reaches the station at which it is to be set, the stop clutch 62 will be revolved by the stop wheel 61 to a position where it will engage the keeper lug 81a and prevent further rotation of the units trip wheel 58. This will prevent overrunning of the units trip wheel 58 during setting thereof. It will be noticed from Fig. 8 that each of the stop clutches 62 and 65 are formed with a recessed marginal edge identified at 65a in Fig. 8. It will be noticed that the stop clutch 62 is urged toward the lug 81a by a spring 98 when the hand wheel 40 is being operated, and when the notch or recess 65a in its periphery registered with the stop lug 81a, it will move further toward the wheel 81 and the engagement of the lug 81a with the notch or recess 65a will perform the function just above set out and prevent further rotation of the units trip wheel 58.

Similarly the keeper wheel 82 is provided with a keeper lug 82a this lug, however, being relatively movable circumferentially with respect to the keeper wheel 82 to a limited extent, in that the lug projects through a slot, as illustrated in Fig. 6, the slot being of a length permitting movement of the keeper lug 82a one-half the distance between stations or eighteen degrees, a spring 82b holding it eighteen degrees retarded.

The reason for retardation is that if it was in its true position when the tens trip wheel 59 assumes its set position at the pre-selected station, the clutch 65 (under certain settings) would engage the keeper lug 82a and prevent further movement of the tens trip wheel 59. Under the circumstances where the indicator wheels 35 and 36 are set to have the meter discharge a quantity less than ten gallons, it is necessary that the clutch 65 be not permitted to engage the keeper lug 82a prior to the setting operation of the tripping wheels 58 and 59, which is, as before described, accomplished by rotating the trip wheel shaft 31. This is because initial movement from a zero position of the units trip wheel 58, or that portion of movement from zero to nine station, accomplishes a transfer of movement to the tens trip wheel 59 through the transfer mechanism described, and consequently if the clutch 65 were in engagement with the stationary keeper lug 82a, the tens trip wheel would be locked against rotation which would, through the transfer mechanism, lock the units trip wheel 58 from operation which would render the device inoperative.

However, by having the keeper lug 82a eighteen degrees in retarded position it will engage the end of the clutch 65 so that the latter will be free to revolve. However, on continuation of the setting of the trip wheels 58 and 59, during which the clutch 65 is revolved, and when the setting is complete, the clutch will come up again and engage the keeper 82a and move it against its spring eighteen degrees with respect to the keeper wheel 82 to a true set position.

The pawl wheels 71 and 72 are set at 180 degrees so that the pawl wheel 71 may then pick up the tens trip wheel 59 at its new position to which it was brought by the transfer action and drive it back to its correct set position.

It has been described that the trip wheels 58 and 59 are set in position by turning movement of the trip wheel shaft 31 through the pawl wheels 71 and 72. It should be pointed out here that after the indicator wheels 35 and 36 have been set, as previously described, the setting of the trip wheels 58 and 59 is accomplished just prior to the opening of the shut off valve 12 by a mechanism which is associated with the valve member of that valve. This mechanism includes a rack 83 which is guided for reciprocation perpendicularly of the shaft 31 in the base plate 14 of the counter housing. The teeth of this rack are, through an intermediate gear, in driving connection with a pinion 84 fixed on the shaft 31 so that movement of the rack in one direction will revolve the shaft 31 and effect the setting of the trip wheels 58 and 59, as previously described.

Referring to Figs. 1 to 4, inclusive, it will be seen that the valve is provided with a valve shaft 85 on which is fitted two valve operating levers 86 and 87. The valve shaft is fitted with a key 88 embedded in the valve shaft and having a gib end 88a projecting in an arcuate slot 88b (see Fig. 16) in the inner end of the hub of the valve lever 87 so that this valve lever may have a given amount of rotative movement about the axis of the shaft 85 without imparting turning movement to the valve shaft 85, this being clear from Figs. 17 and 18. The amount of this movement is sufficient to impart a sufficient amount of movement to the rack to effect the setting of the trip wheels 58 and 59, and sufficient for a subsequent movement of a clutch operating cam 92a just subsequent to the movement of the rack. Thereafter continued movement of the lever 87 effects opening of the valve 12.

For the purpose of operating the rack and the clutch operating cam previously described, the free end of the valve lever 87 is provided with a pivotal link 89, the outer end of which is fitted with a projecting trip pin 90 so disposed as to underlie the rack 83. The outer end of the rack, as illustrated, is down turned so as to hook over the trip pin 90 as illustrated in Fig. 5. There is a fixed abutment plate 91 on the rack between which the trip pin 90 is normally confined by means of a stationary cam 92 on the top of the body of the valve 12 so that swinging movement of the lever 87 toward the meter will effect endwise movement of the rack a sufficient amount to completely set the trip wheels 58 and 59 as previously described. Immediately upon this sufficient amount of movement being imparted to the rack, the stationary cam 92 enables the pin to disengage from the abutment plate 91 and to engage a movable slide 93 carried by the rack 83 and movable to a limited extent longitudinally thereof. The stationary cam 92 then holds the trip pin 90 in engagement with this movable slide 93 so that continued movement of the valve operating lever 87 in the same direction will advance the movable slide 93 toward the meter and relative to the rack 83.

The purpose of the cam 92a on the slide is to operate the stop clutches 62 and 65 and move them to a neutral position with respect to the keeper lugs 81a and 82a. It will be noticed from Fig. 6 that each of these clutches is fitted with forks 94 and 95 mounted on a clutch shaft 96 carried by the frame in parallelism with the shaft 34. The clutches are so arranged that they are independently moved into engagement and are urged in this condition by springs 97 and 98, but may be moved out of engagement or to a neutral position simultaneously by the cam 92a engaging the fork 95. As shown in Fig. 6, the fork 95 is pinned to the clutch shaft and a collar 99 is likewise pinned to the clutch shaft to engage the fork 94 to move it to neutral position when the clutch shaft is shifted, the fork 94, however, being slidably mounted on the clutch shaft so that the clutches may be independently engaged as previously described.

After the trip pin 90 has moved the slide 93 a sufficient distance to move the clutches 62 and 65 to neutral position, as just described, due to the stationary cam 92, the trip pin disengages from the slide 93 so that continued forward movement in an opening direction of the valve operating lever 87 will commence opening the valve member of the shut off valve 12. When the opening of the valve has been fully effected, the trip pin 90 will be engaged by a latch plate 101 pivotally mounted on the meter as at 102. It will be seen from Fig. 5 that as the trip pin 90 passes under this plate, the latter will drop down, latching the lever 87 in its forward position with the valve open.

It will be noticed that the latch plate 101 is connected with a trigger pin 103 carried by a trigger rod 104 connected by a spring 105 to the counter casing, which spring urges the trigger rod in a direction maintaining the latch plate 101 in latching position with respect to the trip pin 90. It will also be noticed that movement of the trigger rod in the direction of the arrow a in Fig. 4 will swing the detent plate 101 in the direction of the arrow b in Fig. 5 and release the trip pin 90 and allow the spring 105 together with the pressure of the fluid on the valve and the valve spring itself to move the valve member to shut position and rapidly move the valve operating lever 87 to closed position. It will be obvious from the drawings that during this movement the trip pin 90 (which will be to the right in Figs. 5 and 18) will engage the down turned end of the rack 83 and withdraw the rack in a direction to the right in Figs. 5 and 18 so that it will be in a position for a subsequent resetting operation. It should be stated that in the valve opening movement and in the resetting operation the rack and the pin 90 move in a direction to the left in Figs. 5 and 18.

It is also to be pointed out that withdrawing of the rack and the accompanying turning of the trip wheel shaft 31 has no effect on the position of the trip wheels 58 and 59, due to the fact that the pawls 75 of the pawl wheels 71 and 72 will be ineffective in engaging the lugs 80 when the pawl wheels are revolved in the direction which they are revolved during the withdrawal of the rack.

It should also be pointed out that upon initial movement of the rack (which movement is to the right in Figs. 5 and 18), the cam 92a disengages from the clutch fork 95 and enables the springs 97 and 98 to urge the clutches 62 and 65 toward the keeper wheels 81 and 82 so that they will be in condition for a subsequent resetting operation.

To operate the trigger rod to accomplish the results just referred to, the trigger rod 104 is associated with a hinge plate 107 which is mounted within the base plate 14 and hinged to the base plate for vertical swinging movement by a hinge 108. Pivoted at 109a to the hinge plate 107 for swinging movement in the same plane as the plane of the movement of the trigger rod 104 is a trigger plate 109. The hinge plate 107 has an upturned trigger lug 110 to engage the periphery of the tens trip wheel 59, while the trigger plate 109 has an upturned trigger lug 111 to engage the periphery of the units trip wheel 58. A spring 112 is connected with the trigger plate 109 and constantly urges the same in a direction away from the trigger rod 104 and constantly urges the lugs 110 and 111 radially toward the center of the trip wheels 58 and 59, so that when the notches in the trip wheels reach zero station, these trigger lugs 110 and 111 will project into these notches and continued driving movement of the trip wheel 58, due to its connection with the meter through the worm wheel 21, the sharp shoulder of the trip notch in said wheel will engage the lug 111 and move the trigger plate 109 into engagement with the trigger rod 104, moving the same outwardly and thus swing the latch plate 101 about its pivot point 102, releasing the trip pin 90 so that the valve may close and the valve operating lever 87 returned to starting position as originally described.

When the trip wheels are reset and the lugs 110 and 111 are forced out of engagement with the slots in the periphery of the trip wheels 58 and 59, due to the hinge joint 108, the trigger plate 109 and the plate 107 will be moved back to their original or normal positions by means of the springs 105 and 112.

In operation of the device, assuming that it is desired to dispense say fifteen gallons, the key 47 is turned to disengage the latch plate 43 from the hand wheels 39 and 40 and the latter are turned, as previously described, to set the indicator wheels 35 and 36 to indicate the number "15" thereon, turning the units indicator wheel 35 to the "5" station and the tens indicator wheel 36 to the "1" station. This, as previously described, will set the set wheels 50 and 51 and the keeper wheels 81 and 82. During this time, of course, the trip wheels 58 and 59 will be in zero position, due to the fact of the valve being closed. The key 47 is then turned to return the latch plate 43 in latching position with respect to the hand wheels 39 and 40, latching the various elements controlled thereby in a fixed position.

At this time, of course, the clutches 62 and 65 are in the positions to engage the keeper lugs 81a and 82a upon the setting of the trip wheels 58 and 59. The valve lever 87 is then grasped and swung in a direction (to the left in Fig. 18) tending to open the valve. The initial movement of the lever 87 will be ineffective in opening the valve, but will shift the rack 83, revolving the trip wheel shaft 31 and through the medium of the pawl wheels 71 and 72 set the trip wheels 58 and 59 to their proper stations. The units trip wheel 58 will be set at station "5," while the tens trip wheel 59 will be set at station "1." These wheels will be prevented from overrunning their stations due to the provision of the clutches 62 and 65 cooperating with the keeper lugs 81a and 82a on the keeper wheels 81 and 82, as previously described.

After the rack has been positioned, continued forward movement of the lever 87 will move the movable slide 93 forwardly sufficiently to engage the cam 92a with the shifting fork 95, and thereupon shift the clutches to neutral position. Thereafter continued movement of the lever 87 will open the valve and the meter will commence operating.

When the meter commences operating, a drive is transmitted from the meter to the meter counter drive shaft 17 and from this shaft through the spur gears 19 to the counter drive shaft 18. From this shaft the drive will be transmitted through the worm 20 to the worm wheel 21 on the counter drive shaft 22 and, as previously described, will operate the totalizer counter assembly 15 which is intended to indicate the total of all fluid passed through the meter. At the same time the worm wheel 21 through the one-way ratchet mechanism previously described will impart a drive to the units trip wheel 58, and through the transfer mechanism to the tens trip wheel 59 so that the latter will align its trip notch with the lug 110 and when the notch of the wheel 58 aligns with the lug 111 subsequent to the alignment of the notch of the tens trip wheel, the lug 110 will move upwardly into the notch in the trip wheel 59, and the lug 111 will move upwardly into the notch of the trip wheel 58, and as the latter continues to rotate, it will engage the lug 111 and move the trigger plate 109 forwardly in a direction moving the trigger rod 104 outwardly, swinging the latch plate 101 about its pivot and releasing the trip pin 90.

The moment that the trip pin is released, the spring forces associated with the lever and valve, and the fluid pressure against the valve will seat the valve and in so doing will swing the lever 87 to starting position. During this latter swinging movement of the lever the trip pin 90 will engage the turned down end of the rack 83 and withdraw the rack to a starting position.

Thus, it is seen that by merely swinging the valve opening lever 87 from its starting position to the valve opening position, the mechanism of the automatic packaging and valve trip mechanism is reset for a subsequent operation, and that each time the gallonage or quantity indicated by the indicator wheels 35 and 36 has been delivered by the meter, that the shut off valve 12 will be automatically closed. This operation may be repeated as many times as desired.

It is further evident that the operator may select the amount of the quantity to be delivered by simple manipulation of the key 47, the hand wheels 39 and 40, so that the indicator wheels 35 and 36 may indicate the desired quantity of the package desired to be repeatedly delivered by the meter.

Figure 18:
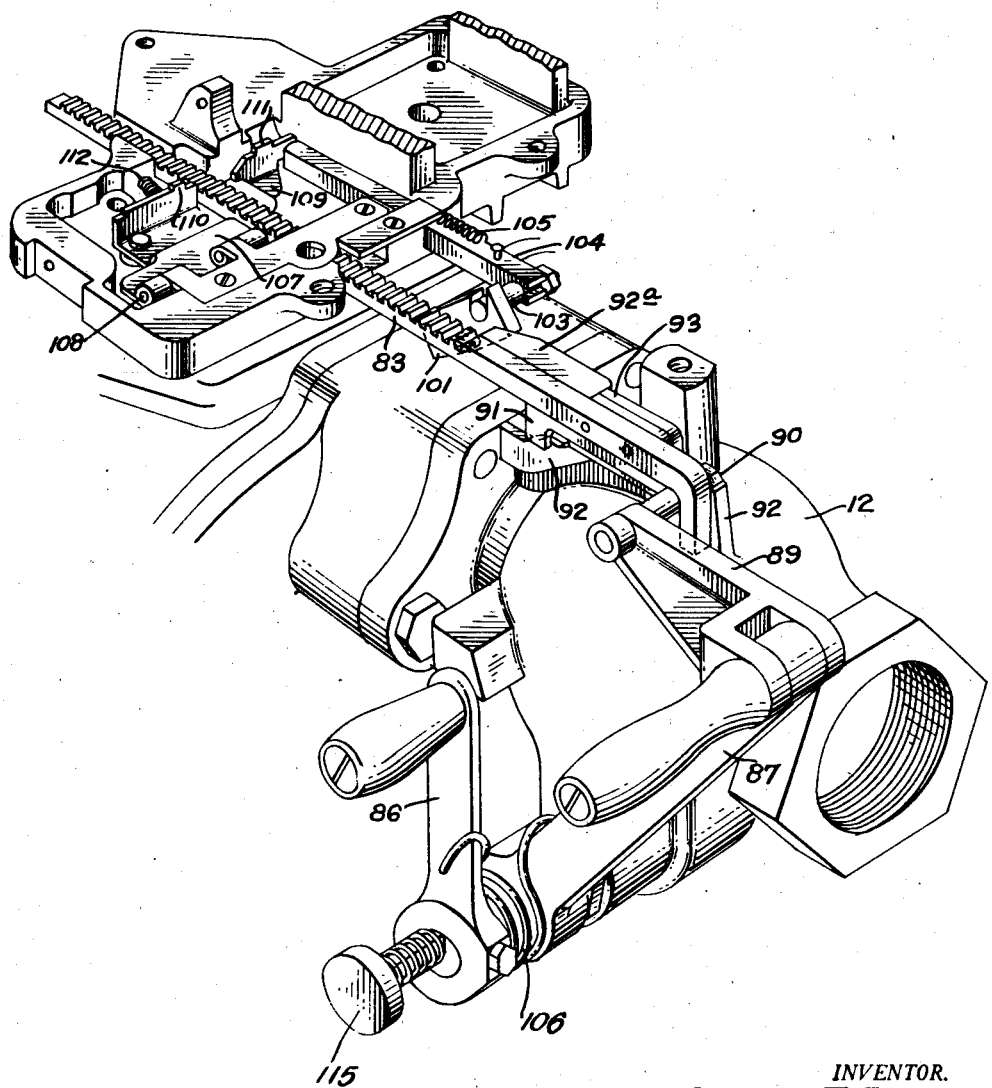
Fig. 18 is a view in perspective showing the operative association between the valve operating lever and the automatic trip mechanism.

It will be noticed from Figs. 1, 2, 17 and 18 of the drawings that the valve operating handle 86 may be operated independently of the handle 87 to operate the shut off valve 12. Likewise, it will be seen that an emergency release member 115 is provided which may be depressed to disconnect, as shown in Figs. 17 and 18, to render ineffective the connection between the handle 87 and the valve shaft 85 so that the valve may be closed independently of the operation of the handle 87 in the case of an emergency.

From the foregoing it is obvious that I have provided a very efficient apparatus for fluid meters which enables predetermining of the quantity of liquid that shall be delivered from the meter on each operation, the delivery of which quantity may be repeated any number of times without further manipulation of the mechanism other than a single manual operation resulting in the opening of the meter shut off valve and operation of the meter.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a device of the character described, a rotatable setting shaft, a set wheel geared to said shaft to be set thereby at any one of a plurality of stations, a trip wheel normally rotatable with respect to said set wheel, operable means associated with the trip wheel and the set wheel for rotating the trip wheel toward the station at which said set wheel is positioned and actuated by the set wheel to release said trip wheel when the latter reaches said station, a keeper wheel operated with the set wheel to assume a corresponding station, stop means operatively connected to the trip wheel to cooperate with the keeper wheel in stopping rotation of the trip wheel when the latter is released at its station.

2. In a device of the character described, a rotatable setting shaft, an indicator wheel operatively connected therewith and capable of being set thereby to any one of a plurality of stations, a set wheel geared to said shaft to be set thereby simultaneously with and at a station corresponding to the indicator wheel, a trip wheel shaft, a trip wheel normally rotatably mounted thereon, means for revolving said shaft, means fixed on said shaft and operatively associated with the trip wheel and set wheel whereby rotation of said shaft will be accompanied by rotation of the trip wheel in a direction toward the station at which said set wheel is set, said means being operated by the set wheel to release said trip wheel when it reaches said station, a keeper wheel operated with the set wheel to assume a station corresponding thereto, and stop means geared to the trip wheel to cooperate with said keeper wheel in stopping rotation of the trip wheel when the latter is released during its setting operation.

3. In a device of the character described, a rotatable setting shaft, a set wheel operatively geared to said shaft to be set thereby, a trip wheel, means associated with the trip wheel and with the set wheel and capable of operation to revolve the trip wheel relative to the set wheel and toward the station at which it is positioned and actuated by the set wheel to release said trip wheel at said station, latch means normally latching said setting shaft against rotation.

4. In a device of the character described, a rotatable setting shaft, a set wheel operatively geared to said shaft to be set thereby, a trip wheel, means associated with the trip wheel and with the set wheel and capable of operation to revolve the trip wheel relative to the set wheel and toward the station at which it is positioned and actuated by the set wheel to relase said trip wheel at said station, and key controlled latch means normally latching said setting shaft against rotation.

5. In a device of the character described, a rotatable setting shaft, a set wheel geared thereto and adapted to be set by operation thereof to any one of a plurality of stations, a trip wheel shaft rotatable with respect to the set wheel, a trip wheel normally rotatable on said trip wheel shaft, operable means for revolving said trip wheel shaft, means on the trip wheel shaft operatively associated with the trip wheel and the set wheel and capable upon rotation of said trip wheel shaft to rotate said trip wheel toward the station at which said set wheel is positioned and to release said trip wheel when it reaches said station, and key controlled latch means normally latching said setting shaft against rotation.

6. In a device of the character described, a rotatable setting shaft, a set wheel geared to said shaft to be set thereby at any one of a plurality of stations, a trip wheel normally rotatable with respect to said set wheel, operable means associated with the trip wheel and the set wheel for rotating the trip wheel toward the station at which said set wheel is positioned and actuated by the set wheel to release said trip wheel when the latter reaches said station, a keeper wheel operated with the set wheel to assume a corresponding station, stop means operatively connected to the trip wheel to cooperate with the keeper wheel in stopping rotation of the trip wheel when the latter is released at its station, and key controlled latch means normally latching said setting shaft against rotation.

7. In a device of the character described, a rotatable setting shaft, a set wheel geared to said shaft to be positioned thereby in any one of a plurality of stations, a trip wheel shaft disposed in alignment with the set wheel, a trip wheel rotatably mounted on said shaft adjacent said set wheel, axially projecting lugs on the set wheel and trip wheel, a pawl carried by the trip wheel shaft to revolve therewith and normally capable of engaging the lug on the trip wheel when revolved in one direction to revolve said trip wheel toward setting position, said pawl being engaged by the lug on said set wheel when the trip wheel reaches a station corresponding to that of the set wheel, said engagement releasing said pawl from the lug on the trip wheel, and means for revolving the trip wheel shaft in the proper direction for setting said trip wheel.

8. In a device of the character described, a rotatable setting shaft, a set wheel geared to said shaft to be positioned thereby in any one of a plurality of stations, a trip wheel shaft disposed in alignment with the set wheel, a trip wheel rotatably mounted on said shaft adjacent said set wheel, axially projecting lugs on the set wheel and trip wheel, a pawl carried by the trip wheel shaft to revolve therewith and normally capable of engaging the lug on the trip wheel when revolved in one direction to revolve said trip wheel toward setting position, said pawl being engaged by the lug on said set wheel when the trip wheel reaches a station corresponding to that of the set wheel, said engagement releasing said pawl from the lug on the trip wheel, a keeper wheel geared to the set wheel and having an axially projecting lug, a stop wheel geared to the trip wheel and revoluble therewith, a clutch member revolving with the stop wheel and movable axially with respect thereto and normally in a position to engage the stop on the keeper wheel so as to be relatively non-rotatable with respect to the keeper wheel when the trip wheel has reached its set station with respect to the set wheel, means for revolving the trip wheel shaft in the direction necessary to set the trip wheel.

9. In a device of the character described, a rotatable setting shaft, a set wheel geared to said shaft to be positioned thereby in any one of a plurality of stations, a trip wheel shaft disposed in alignment with the set wheel, a trip wheel rotatably mounted on said shaft adjacent said set wheel, axially projecting lugs on the set wheel and trip wheel, a pawl carried by the trip wheel shaft to revolve therewith and normally capable of engaging the lug on the trip wheel when revolved in one direction to revolve said trip wheel toward setting position, said pawl being engaged by the lug on said set wheel when the trip wheel reaches a station corresponding to that of the set wheel, said engagement releasing said pawl from the lug on the trip wheel, a keeper wheel geared to the set wheel and having an axially projecting lug, a stop wheel geared to the trip wheel and revoluble therewith, a clutch member revolving with the stop wheel and movable axially with respect thereto and normally in a position to engage the stop on the keeper wheel so as to be relatively non-rotatable with respect to the keeper wheel when the trip wheel has reached its set station with respect to the set wheel, a gear fixed on the trip wheel shaft, a reciprocable rack in mesh therewith, and means on said rack for shifting said clutch member to neutral position subsequent to the positioning of the trip wheel.

10. In a device of the character described, a pair of telescopic setting shafts, a set wheel for each setting shaft and geared thereto whereby they may be independently set at any one of a plurality of stations, a trip wheel shaft arranged coaxially of the setting shafts, a pair of trip wheels mounted on said trip wheel shaft one adjacent each set wheel forming two pairs of cooperative trip and set wheels, a rotary pawl for each pair of trip and set wheels, axially extending lugs on the wheels of each pair of trip and set wheels, said pawls capable upon rotation of said trip wheel shaft of engaging the lugs of the trip wheels to move the same toward the station at which said set wheels are set, the lugs on said set wheels releasing the engagement of said pawls with the lugs on the trip wheels when said trip wheels reach said stations, a gear fixed on the trip wheel shaft, and a reciprocable rack engaged therewith for revolving said shaft in a direction causing setting of the trip wheels.

11. In a device of the character described, a pair of telescopic setting shafts, a set wheel for each setting shaft and geared thereto whereby they may be independently set at any one of a plurality of stations, a trip wheel shaft arranged coaxially of the setting shafts, a pair of trip wheels mounted on said trip wheel shaft one adjacent each set wheel forming two pairs of cooperative trip and set wheels, a rotary pawl for each pair of trip and set wheels, axially extending lugs on the wheels of each pair of trip and set wheels, said pawls capable upon rotation of said trip wheel shaft of engaging the lugs of the trip wheels to move the same toward the station at which said set wheels are set, the lugs on said set wheels releasing the engagement of said pawls with the lugs on the trip wheels when said trip wheels reach said stations, a gear fixed on the trip wheel shaft, and a reciprocable rack engaged therewith for revolving said shaft in a direction causing setting of the trip wheels, a trip mechanism operatively associated with said trip wheels and adapted to trip when said wheels are returned to their initial station.

12. In a device of the character described, a pair of telescopic setting shafts, a set wheel for each setting shaft and geared thereto whereby they may be independently set at any one of a plurality of stations, a trip wheel shaft arranged coaxially of the setting shafts, a pair of trip wheels mounted on said trip wheel shaft one adjacent each set wheel forming two pairs of cooperative trip and set wheels, a rotary pawl for each pair of trip and set wheels, axially extending lugs on the wheels of each pair of trip and set wheels, said pawls capable upon rotation of said trip wheel shaft of engaging the lugs of the trip wheels to move the same toward the station at which said set wheels are set, the lugs on said set wheels releasing the engagement of said pawls with the lugs on the trip wheels when said trip wheels reach said stations, keeper wheels geared to said set wheels and having axially projecting lugs, stop wheels geared to said trip wheels, a clutch means for each stop wheel axially movable but non-rotatable with respect thereto and capable of engaging the lugs on the keeper wheels when said trip wheels reach the stations corresponding to the stations at which the set wheels are positioned to stop rotation of said trip wheels, a gear fixed on the trip wheel shaft, a rack in mesh therewith, cooperating means on the rack and said clutch means capable of moving the same to neutral position out of engagement with the lugs on the keeper wheels after said keeper wheels have been positioned.

13. In a device of the character described, a pair of telescopic setting shafts, a set wheel for each setting shaft and geared thereto whereby they may be independently set at any one of a plurality of stations, a trip wheel shaft arranged coaxially of the setting shafts, a pair of trip wheels mounted on said trip wheel shaft one adjacent each set wheel forming two pairs of cooperative trip and set wheels, a rotary pawl for each pair of trip and set wheels, axially extending lugs on the wheels of each pair of trip and set wheels, said pawls capable upon rotation of said trip wheel shaft of engaging the lugs of the trip wheels to move the same toward the station at which said set wheels are set, the lugs on said set wheels releasing the engagement of said pawls with the lugs on the trip wheels when said trip wheels reach said stations, a gear fixed on the trip wheel shaft, and a reciprocable rack engaged therewith for revolving said shaft in a direction causing setting of the trip wheels, and key controlled latch means normally latching said setting shafts against rotation.

14. In a device of the character described, a pair of telescopic setting shafts, a set wheel for each setting shaft and geared thereto whereby they may be independently set at any one of a plurality of stations, a trip wheel shaft arranged coaxially of the setting shafts, a pair of trip wheels mounted on said trip wheel shaft one adjacent each set wheel forming two pairs of cooperative trip and set wheels, a rotary pawl for each pair of trip and set wheels, axially extending lugs on the wheels of each pair of trip and set wheels, said pawls capable upon rotation of said trip wheel shaft of engaging the lugs of the trip wheels to move the same toward the station at which said set wheels are set, the lugs on said set wheels releasing the engagement of said pawls with the lugs on the trip wheels when said trip wheels reach said stations, keeper wheels geared to said set wheels and having axially projecting lugs, stop wheels geared to said trip wheels, a clutch means for each stop wheel axially movable but non-rotatable with respect thereto and capable of engaging the lugs on the keeper wheels when said trip wheels reach the stations corresponding to the stations at which the set wheels are positioned to stop rotation of said trip wheels, a gear fixed on the trip wheel shaft, a rack in mesh therewith, cooperating means on the rack and said clutch means capable of moving the same to neutral position out of engagement with the lugs on the keeper wheels after said keeper wheels have been positioned, and latch means normally holding said setting shafts against rotation, said latch means being capable of being released by key operation.

15. In a device of the character described, a pair of telescopic setting shafts relatively rotatable, latch means normally holding said shafts against rotation, said latch means being capable of being released to enable rotation of said shafts, a pair of independently operated indicator wheels geared one to each shaft whereby they may be positioned independently at any one of a plurality of stations, two set wheels one geared to each setting shaft to be set by rotation thereof to a station corresponding to the station at which the associated indicator wheel is set, a trip wheel shaft arranged coaxially of the setting shaft, two trip wheels on said trip wheel shaft one adjacent each set wheel forming two pairs of set and trip wheels, a pawl wheel secured on the shaft between the set and trip wheels of each pair, a radially movable pawl carried by each pawl wheel, the set and trip wheels of each pair having axially projecting lugs for cooperation with the pawl of the adjacent pawl wheel, said pawls being capable upon rotation of the trip wheel shaft to engage the lugs of the trip wheels and rotate the latter toward the stations at which the set wheels are positioned, the lugs of the set wheels being capable of disengaging the pawls from the lugs of the trip wheels when the latter reach the stations of the set wheels, means for manually rotating the trip wheel shaft, and driven means subsequently operated to drive said trip wheels to their initial positions.

16. In a device of the character described, a pair of telescopic setting shafts relatively rotatable, latch means normally holding said shafts against rotation, said latch means being capable of being released to enable rotation of said shafts, a pair of independently operated indicator wheels geared one to each shaft whereby they may be positioned independently at any one of a plurality of stations, two set wheels one geared to each setting shaft to be set by rotation thereof to a station corresponding to the station at which the associated indicator wheel is set, a trip wheel shaft arranged coaxially of the setting shaft, two trip wheels on said trip wheel shaft one adjacent each set wheel forming two pairs of set and trip wheels, a pawl wheel secured on the shaft between the set and trip wheels of each pair, a radially movable pawl carried by each pawl wheel, the set and trip wheels of each pair having axially projecting lugs for cooperation with the pawl of the adjacent pawl wheel, said pawls being capable upon rotation of the trip wheel shaft to engage the lugs of the trip wheels and rotate the latter toward the stations at which the set wheels are positioned, the lugs of the set wheels being capable of disengaging the pawls from the lugs of the trip wheels when the latter reach the stations of the set wheels, a keeper wheel geared to each set wheel, a stop wheel geared to each trip wheel, a clutch member for each stop wheel axially movable but non-rotatable with respect thereto, each keeper wheel having an axially projecting lug circumferentially positioned in a station corresponding to the station of its associated set wheel, the cooperating clutch member of the cooperating stop wheel capable of engaging said lug when the trip wheel has reached the station corresponding to the station of its associated set wheel, a gear secured on the trip wheel shaft, a reciprocable rack in mesh therewith and capable of manual operation to revolve said shaft in a direction setting the tripping wheels, means associated with said rack and said clutch members for moving the latter out of engagement with their associated lugs after the trip wheels have been set, and driven means for driving said trip wheels in proper relation toward their initial position subsequent to their being set and said clutches being disengaged from the lugs of the respective keeper wheels.

17. In an apparatus of the character described, a shaft, a trip wheel rotatably mounted on the shaft, a set wheel mounted on the shaft and rotatable with respect thereto and adapted to be fixedly held in any one of a plurality of stations, an axially projecting lug on the set wheel positioned at an eccentric point with respect thereto, an axially extending lug on said trip wheel extending toward the lug of the set wheel at a similar eccentric point, a pawl wheel secured on the shaft between said wheels with its outer periphery of a diameter less than the amount of eccentricity of said lugs, a pawl carried by the pawl wheel and movable axially with respect thereto and normally spring held in a position where it will engage said lugs whereby rotation of the shaft in one direction will cause said pawl to engage the lug of the trip wheel and revolve said wheel, said pawl having a cam surface adapted to be engaged by the lug of the set wheel and when so engaged to be moved radially inward to disengage from the lug of the trip wheel.

WILLIAM F. BERCK.